July 14, 1931.     J. R. BEARD ET AL     1,814,278
INDICATING APPARATUS
Filed April 3, 1930     3 Sheets-Sheet 3

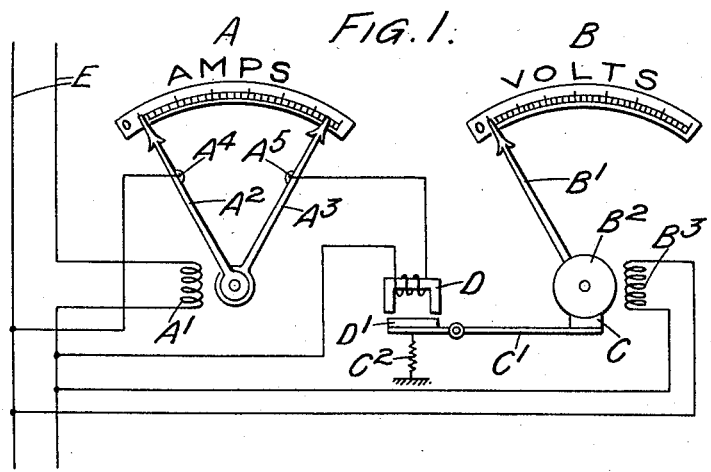
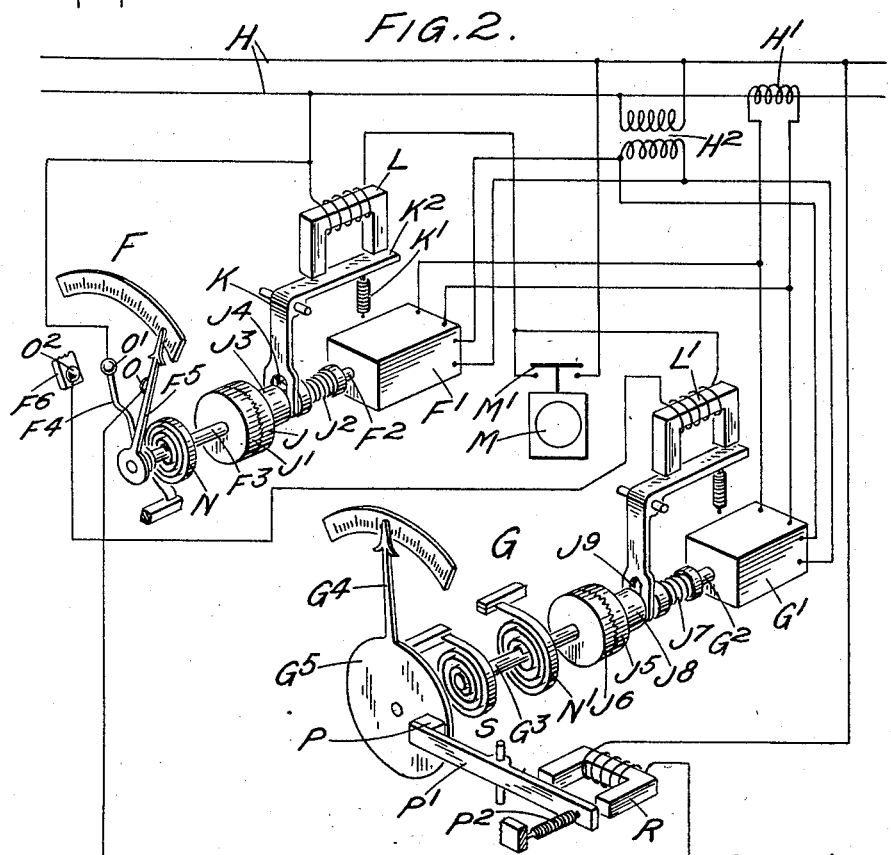

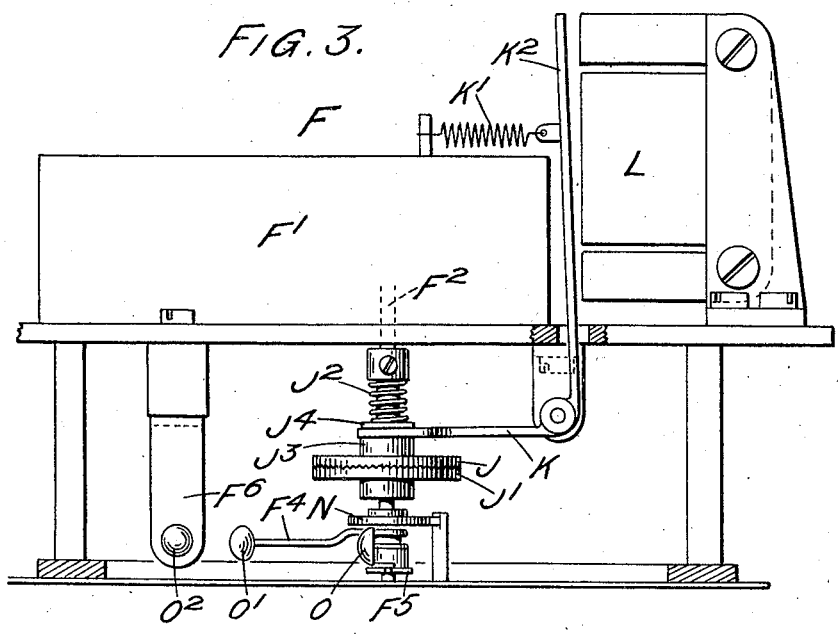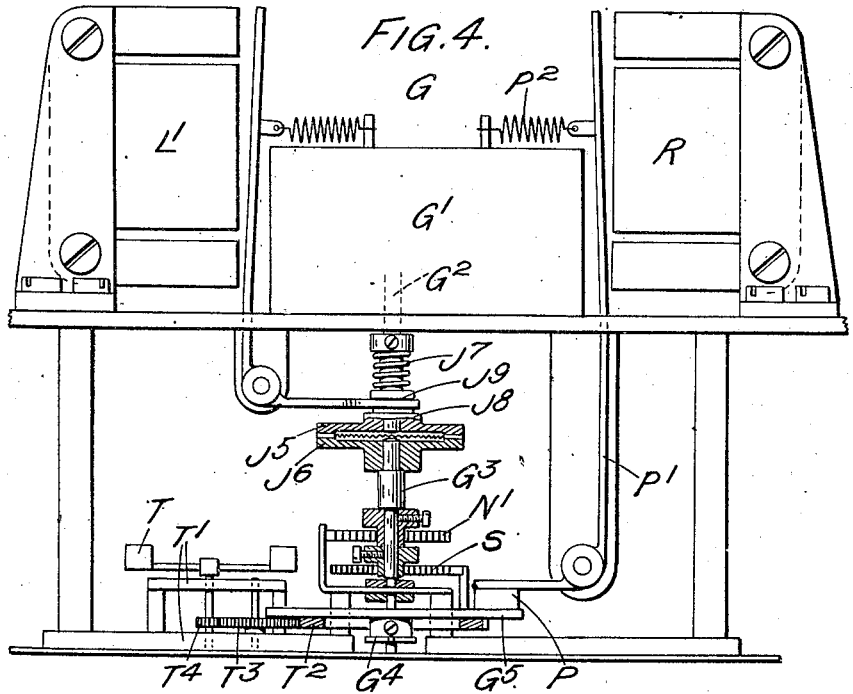

Patented July 14, 1931

1,814,278

UNITED STATES PATENT OFFICE

JAMES ROBERT BEARD, OF KENSINGTON, LONDON, AND GRAHAM LEIGH PORTER, OF MANCHESTER, ENGLAND, ASSIGNORS TO ELECTRICAL IMPROVEMENTS LIMITED, OF NEWCASTLE-UPON-TYNE, ENGLAND, A COMPANY OF GREAT BRITAIN

INDICATING APPARATUS

Application filed April 3, 1930, Serial No. 441,378, and in Great Britain May 29, 1929.

This invention relates to indicating apparatus and has as its object the provision of an arrangement in which an indication is retained of the value of one quantity corresponding to a predetermined value of another quantity.

According to this invention indicating or recording apparatus comprises the combination of two instruments or two parts of the same instrument adapted to indicate or record two quantities, one instrument having a pointer or other movable member provided with a brake and the other having means for controlling the brake so that the pointer is operated or released to indicate or record one quantity in relation to a maximum or minimum or some predetermined value of the other quantity. Preferably the brake is arranged to be released by an electromagnet and the controlling instrument carries contacts operable to complete the circuit of the electromagnet when the quantity measured by the instrument is a predetermined value.

In order that the pointer may be retained set in an indicating position by means of the brake without at the same time clamping the movement of the instrument, the pointer may be flexibly connected to the movement of the instrument as by a spiral spring. The controlling instrument may also be provided with an indicating pointer in which case such pointer may carry a contact arranged to cooperate with another contact preferably carried on a "maximum" or "minimum" pointer so as to complete the releasing circuit of the brake.

A preferred arrangement for electric metering comprises the combination of a reactive watt-hour-meter having a pointer flexibly connected to the movement of the meter and an electromagnetic brake for retaining the pointer set in an indicating position, and a watt-hour-meter having an arm or pointer adapted in its maximum position to complete a release circuit for the brake so that an indication is retained of the value of the reactive power corresponding to the maximum value of the power measured by the wattmeter.

Several arrangements of measuring devices according to the invention and suitable for various purposes will now be described by way of example with reference to the accompanying drawings, in which Figure 1 shows a wiring diagram of two cooperating indicating meters.

Figure 2 shows diagrammatically a preferred arrangement for determining the value of reactive power or power factor of a system corresponding to the maximum power demand measured during a succession of definite time periods.

Figures 3 and 4 show plan views of the pointer and resetting mechanism of the meters employed in the arrangement shown in Figure 2.

Figure 5:
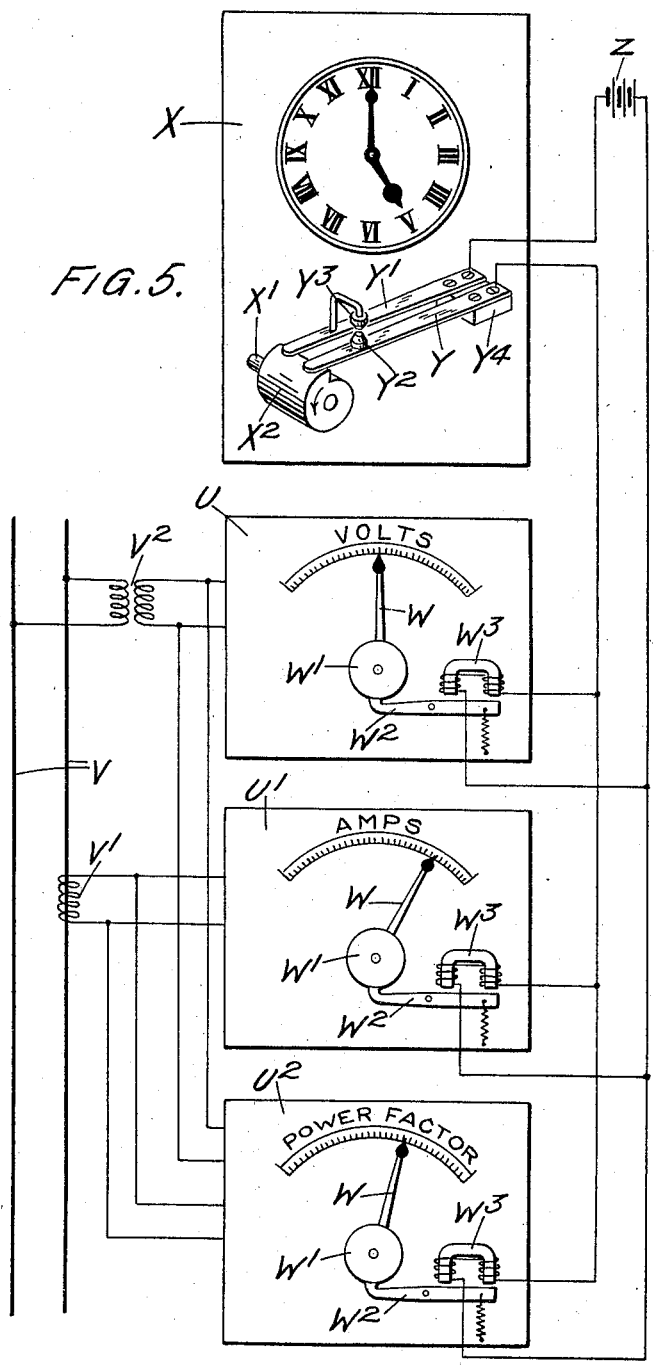
Figure 5 is a wiring diagram showing the control of three indicating meters by a clock mechanism.

In the arrangement shown in Figure 1, an ammeter A is arranged to control an electromagnetic brake on the pointer of a voltmeter B so that an indication is retained of the voltage when the load on the system is maximum. This the pointer $B^1$ of the voltmeter is provided with a disc $B^2$ with which a brake block C carried at the end of a pivoted lever $C^1$ cooperates, the lever being biased by a spring $C^2$ so that the brake block C normally engages the disc $B^2$ to retain the pointer $B^1$ "set" in an indicating position.

An electromagnet D is arranged so that when it is energized it attracts an armature $D^1$ on the lever $C^1$ and lifts the lever so as to release the brake and permit the voltmeter pointer $B^1$ to take up a position corresponding to the voltage of the circuit E to which the winding and operating coil $B^3$ of the meter B is connected.

The ammeter A, which has its operating coil $A^1$ connected in series in the same circuit E so as to indicate the current flowing in this circuit, has a pointer $A^2$ driven in the normal manner by the meter movement (not shown) and another pointer $A^3$ which is coaxial with the pointer $A^2$ and is mounted so that it is driven by the pointer $A^2$ towards the upper end of the scale (to the right in the figure) but is retained in position by friction when the current flowing in the circuit E decreases and the pointer $A^2$ moves to the left. The pointer $A^3$ thus gives an indication of the maximum value of current and can, conveniently, be periodically reset by hand to the zero position.

The pointers $A^2$ and $A^3$ carry contacts $A^4$ and $A^5$ arranged in the energizing circuit of the electromagnet D so that this magnet is energized and the pointer $B^1$ of the voltmeter released whenever the pointer $A^2$ is driving the pointer $A^3$. As soon, however, as the current decreases and the pointer $A^2$ moves away from the pointer $A^3$ the electromagnet D is deenergized, the brake block C engages the disc $B^2$ and the voltmeter B remains set in position. An indication is thus retained of the value of the voltage of the circuit E when the current is a maximum.

It is, of course, apparent that it is possible to retain an indication of the current corresponding to the maximum or minimum value of the voltage merely by reversing the functions of the two meters, that is by providing the ammeter pointer with a brake the electromagnet of which is controlled by contacts on the voltmeter.

In some forms of measuring instrument it is not feasible to apply the brake directly to the shaft which carries the pointer and is also directly driven by the movement as of course the movement as well as the pointer is clamped when the brake is "on". This is particularly so in the case of clocks, some forms of indicators driven by integrating mechanism, and in fact all forms of measuring instrument in which the driven part must necessarily be in continuous motion.

It is frequently desirable to know the power factor of an electric power system when the kilowatt demand is a maximum and, as the maximum values of the power factor and the kilowatt demand may not occur at the same time, the installation of two maximum recorders does not provide the requisite information.

This information is often used as a basis for charging in a two-part tariff and for this purpose it is usual to assess the maximum demand not on its instantaneous value but on the maximum demand over a short period, say half-an-hour, in conjunction with the average power factor during this period. Obviously this power factor cannot be obtained from an ordinary power factor indicator and, for this purpose, a reactive-watt-hour-meter (which measures the product of the voltage, the reactive current and the time) is used and the value of the power factor is obtained by a simple calculation. Hitherto it has been customary to instal two instruments which make continuous records of the power and reactive components respectively but such an arrangement besides being expensive is inconvenient and inaccurate.

Such information can however easily be obtained by means of the preferred arrangement according to this invention as shown in Figures 2, 3 and 4 in which a watt-hour-meter F (shown in plan in Figure 3) controls a brake on the pointer of a sine or reactive-watt-hour-meter G (shown in plan in Figure 4.) The watt-hour-meter has a movement, which since it may be of any well known kind, is indicated by the box $F^1$, energized from current and potential transformers $H^1$, $H^2$ in the power circuit H to be metered. The movement $F^1$ drives, through shafts $F^2$ $F^3$ connected by a clutch device, an arm $F^4$ which in turn drives a maximum pointer $F^5$ in the same way as the pointer $A^2$ drives the pointer $A^3$ in the arrangement shown in Figure 1. The clutch device comprises two discs J $J^1$ keyed respectively to the shafts $F^2$ and $F^3$ and having serrated faces so that when they are pressed together by the spring $J^2$ the shafts $F^2$ $F^3$ are positively locked together.

The disc J is arranged to slide axially on the shaft $F^2$ and is provided with a collar $J^3$ having a groove $J^4$ for the forked end of a pivoted bell crank lever K which is normally biased by a spring $K^1$ so that the clutch discs are in engagement. A resetting electromagnet L, energized from the circuit H (or, if desired, from an independent source of supply) through the contacts $M^1$ of a time switch M, is arranged so that when it is energized it attracts the end $K^2$ of the lever K and causes this lever to rock about its pivot and thus to slide the collar $J^3$ and disc J along the shaft $F^2$ to release the clutch and free the shaft $F^3$. The arm $F^4$ is then returned to zero by a biasing spring N. The time switch M operates periodically, say every half-hour, to return the arm $F^4$ to zero and thus the pointer $F^5$ indicates the "half-hour" maximum watt-hour-demand in the metered circuit H during a predetermined period, say one month, the pointer $F^5$ being reset by hand at the end of each period. The pointer $F^5$, the arm $F^4$ and a fixed stop $F^6$, which the arm $F^4$ engages in the zero position, carry contacts O, $O^1$ and $O^2$ respectively which control the reactive watt-hour meter as will be more fully described.

The reactive watt-hour meter G has a movement $G^1$ energized from the transformers $H^1$ $H^2$ which drives the pointer $G^4$ through shafts $G^2$ and $G^3$ connected by a clutch device. This pointer is provided with a brake disc $G^5$ which is engaged by a brake block P mounted on the end of a pivoted lever $P^1$ biased by a spring $P^2$ so that the brake is normally "on" and the pointer $G^4$ is retained "set" in an indicating position. A release electromagnet R is arranged so that when it is energized the lever $P^1$ is moved to release the brake and permit the pointer $G^4$ to move freely.

As the shaft $G^2$ is in continuous movement and must not be clamped when the pointer $G^4$ is held stationary by the brake block P, the pointer is connected to the shaft $G^3$ by a spiral spring S which is wound up or unwound in accordance with the difference between the clamped position of the pointer $G^4$ and the amount the shaft $G^3$ has been moved from the zero position. The shaft $G^3$ is driven by the shaft $G^2$ through a clutch device having parts $J^5$, $J^6$, $J^7$, $J^8$ and $J^9$ similar to the parts J, $J^1$, $J^2$, $J^3$ and $J^4$ of the watt-hour meter F. This clutch is operated by a resetting magnet $L^1$ energized from the circuit H through the contacts $M^1$ of the time switch M and the contacts $O^1$ $O^2$ on the arm $F^4$ and the fixed stop $F^6$ so that the shaft $G^3$ of the meter G is reset by its spring $N^1$ whenever the meter F is reset and its arm returns to the zero position. It is to be noted that the spring $N^1$ of the meter G must be strong compared to the spring S so that when the pointer $G^4$ is held in an indicating position the spring $N^1$ returns the shaft $G^3$ to the zero position and unwinds the spring S.

The brake magnet R is energized from the circuit H through the contacts O $O^1$ on the pointer $F^5$ and the arm $F^4$ of the meter F so that whenever the arm $F^4$ is driving or is in contact with the pointer $F^5$, i. e. when the meter F is recording the maximum value of watt-hours during the period, the brake is released and the pointer $G^4$ is free. When the brake is "off" the pointer $G^4$ is moved by the spring S until it is in a position such that there is no stress in the spring—that is to the position it would occupy if it had been rigidly connected to the shaft $G^3$. The pointer $G^4$ thus indicates the reactive watt-hours corresponding to the maximum value of watt-hours indicated by the pointer $F^5$ of the meter F and, when the arm $F^4$ is reset at the end of the half-hour during which the maximum reading occurs, the contacts O $O^1$ are opened and the brake magnet deenergized to clamp the pointer $G^4$ in this position before the contacts $O^1$ $O^2$ are closed operate the resetting magnet $L^1$ of the meter G.

In order to prevent undue oscillation of the spring S and pointer $G^4$ when the brake is released, a damping device is provided. This device may be of any suitable form but as shown in Figure 4 comprises a wind vane T mounted in independent bearings $T^1$ and driven by the pointer $G^4$ through gears $T^2$ $T^3$ $T^4$ arranged so that the vane has a sufficiently rapid movement.

In the arrangement shown in Figure 5 a voltmeter U, an ammeter $U^1$ and a power factor indicator $U^2$ are energized in the usual way from current and potential transformers $V^1$ $V^2$ in a metered circuit V. The pointer W of each meter is provided with a brake disc $W^1$ and braking mechanism $W^2$ similar to that of the meter B in the arrangement shown in Figure 1. The brake release electromagnets $W^3$ are connected in parallel and are controlled, in a manner to be described, by a clock X so that the brakes of the three meters are released simultaneously for sufficient time for the meters to take up positions in accordance with the metered quantities and indications are thus retained of the voltage, current and power factor of the circuit V at a predetermined time.

As an ordinary contact device driven by clock mechanism would be too slow to give a "make-and-break" in the few seconds which are required for the meter pointers to take up their new positions, a special form of contact device must be provided. In the arrangement shown a shaft $X^1$ driven in any suitable manner by the clock mechanism (not shown) carries a snail cam $X^2$ and is arranged to be rotated by the clock in the direction indicated by the arrow. Two spring strips Y $Y^1$ carrying contacts $Y^2$ $Y^3$ are mounted at one end on a fixed block of insulating material $Y^4$ and have their other ends pressing on the cam $X^2$. The strip $Y^1$ is very slightly shorter than the strip Y so that as the cam $X^2$ rotates the strip $Y^1$ drops from the high to the low surface of the cam just before the strip Y and, in so doing, causes the contact $Y^3$ to engage the contact $Y^2$ and thus to complete the circuit from the battery Z (or any other convenient source of supply) to the release magnets $W^3$. The magnets are energized and release the pointers W to permit them to take up positions corresponding respectively to the voltage, current and power factor in the circuit V. After a very short time further rotation of the cam $X^2$ allows the strip Y to drop to the lower cam surface and to open the contacts $Y^2$ $Y^3$. The brake magnets $W^3$ are deenergized and the pointers are again clamped in position until they are released when the cam has rotated through another revolution.

Obviously the cam can be geared to the clock so that it rotates at a speed corresponding to the frequency of reading required. For example, if the cam rotates once in every twelve hours then the meters are reset every twelve hours, the reading given being that at the time at which the strip Y drops to open the contacts. The difference in length of the strips Y $Y^1$ is, of course, adjusted in accordance with the peripheral speed of the cam so that the pointers are released for the minimum time required for them to take up their new positions. If it is desired to increase the frequency of the readings without altering the speed of the cam and consequently the lengths of the strips, a cam with a greater number of steps can be provided; thus a cam which rotates once in twelve hours and has six steps resets the meters every two hours.

It will be appreciated that the above description is by way of example only and that the arrangement of instruments may be varied in many ways in accordance with the quantities to be measured and compared.

What we claim as our invention and desire to secure by Letters Patent is:—

1. In indicating apparatus the combination of two instruments adapted to indicate two quantities, a pointer for one of the instruments, a brake for the pointer, and means controlled by the other instrument for releasing the brake so that the pointer is operated to indicate the value of one quantity in relation to a predetermined value of the other quantity.

2. In indicating apparatus the combination of at least one electric meter, a pointer thereon, a brake for the pointer, an electromagnetic releasing device for the brake, an operating circuit for the releasing device, a measuring instrument and contacts controlled by the measuring instrument for completing the circuit of the releasing device when the quantity measured by the instrument is a predetermined value so that the meter pointer indicates the value of the metered quantity corresponding to the predetermined value of the quantity measured by the instrument.

3. Indicating apparatus including in combination at least one indicating instrument comprising operating mechanism, a pointer driven thereby, a flexible connection between the operating mechanism and the pointer, and a brake for the pointer, a controlling instrument and means for releasing the brake actuated by the controlling instrument in such a manner that the pointer of the indicating instrument is released when the quantity measured by the controlling instrument is a predetermined value.

4. In indicating apparatus the combination of at least one electric meter, a pointer thereon, a flexible connection between the operating mechanism and the pointer, a brake for the pointer, an electromagnetic releasing device for the brake, an operating circuit for the releasing device, a measuring instrument and contacts controlled by the measuring instrument for completing the circuit of the releasing device when the quantity measured by the instrument is a predetermined value so that the meter pointer indicates the value of the metered quantity corresponding to the predetermined value of the quantity measured by the instrument.

5. In indicating apparatus the combination of at least one electric meter, a pointer thereon, a brake for the pointer, an electromagnetic releasing device for the brake, an operating circuit for the releasing device, a measuring instrument, an indicating arm operated by the instrument, a maximum pointer on the instrument driven by the indicating arm, and cooperating contacts mounted on the indicating arm and the maximum pointer and arranged in the operating circuit of the releasing device so that, when the arm is driving the pointer and the contacts engage, the circuit is completed and the brake released.

6. In indicating apparatus the combination of at least one electric meter comprising a meter movement, an indicating pointer, a spiral spring connecting the movement and the pointer, a brake for the pointer, an electromagnetic releasing device for the brake, and an operating circuit for the releasing device, a measuring instrument, an indicating arm operated by the instrument, a maximum pointer on the instrument driven by the indicating arm, and cooperating contacts mounted on the indicating arm and the maximum pointer and arranged in the operating circuit of the releasing device so that, when the arm is driving the pointer and the contacts engage, the circuit is completed and the brake released.

7. An electric metering arrangement including in combination a reactive watt-hour-meter, a pointer flexibly connected to the meter, a brake for retaining the pointer set in an indicating position, a releasing device for the brake, a watt-hour-meter, an arm driven thereby, and means whereby the brake releasing device is operated to release the pointer when the arm is in a predetermined position so that an indication is retained of the value of the reactive power corresponding to a predetermined value of the power measured by the watt-hour-meter.

8. An electric metering arrangement including in combination a reactive watt-hour-meter, a pointer flexibly connected to the meter, a brake for retaining the pointer set in an indicating position, an electromagnetic releasing device for the brake, an operating circuit for the releasing device, a watt-hour-meter, an arm driven by the meter, a maximum pointer mounted so that it is driven in one direction by the arm and is retained by friction in a maximum position when the arm moves towards zero, and cooperating contacts on the arm and the pointer arranged in the operating circuit of the releasing device so that the pointer of the reactive watt-hour-meter is released when the watt-hour-meter pointer is being driven by the arm.

9. An electric metering arrangement including in combination a reactive watt-hour-meter, a pointer therefor, a spiral spring connecting the pointer and the meter, a brake for retaining the pointer set in an indicating position, an electromagnetic releasing device for the brake, a normally open operating circuit for the releasing device, a watt-hour-meter, an arm driven by the meter, a maximum pointer mounted so that it is driven in one direction by the arm and is retained by friction in a maximum position when the arm moves towards zero, and cooperating contacts on the arm and the pointer arranged in the operating circuit of the releasing device so that the pointer of the reactive watt-hour-meter is released when the watt-hour-meter pointer is being driven by the arm.

10. An electric metering arrangement including in combination a reactive watt-hour-meter, a pointer flexibly connected to the meter, a brake for retaining the pointer set in an indicating position, a releasing device for the brake, a resetting mechanism for the meter, a watt-hour-meter, an arm driven thereby, means whereby the brake releasing device is operated to release the pointer when the arm is in its maximum position so that an indication is retained of the value of the reactive power corresponding to a predetermined value of the power measured by the watt-hour-meter, resetting mechanism for the watt-hour-meter, a time switch for operating the resetting mechanisms of both meters, and means for preventing the resetting mechanism of the reactive watt-hour-meter operating until the watt-hour-meter has been reset.

11. An electric metering arrangement including in combination a reactive watt-hour-meter comprising a meter movement, a pointer, a spiral spring connecting the movement and the pointer, a brake for retaining the pointer set in an indicating position, an electromagnetic releasing device for the brake, an operating circuit for the releasing device, and an electromagnetically operated resetting mechanism, a watt-hour-meter comprising a meter movement, an arm driven by the movement, a maximum pointed mounted so that it is driven in one direction by the arm and is retained by friction in a maximum position when the arm moves towards zero, co-operating contacts on the arm and the pointer arranged in the operating circuit of the brake releasing device so that the pointer of the reactive watt-hour-meter is released when the watt-hour-meter pointer is being driven by the arm, electromagnetically operated resetting mechanism, and a reset contact mounted so that it is engaged by the contact on the arm when the arm is returned to the reset position, a time switch for periodically operating the resetting mechanism of both meters, and an operating circuit for the resetting mechanism of the reactive watt-hour-meter which includes in series the contact carried by the arm of the watt-hour-meter and the reset contact so that the circuit is not completed to operate the resetting mechanism of the reactive watt-hour-meter until the arm returns to the reset position.

In testimony whereof we have signed our names to this specification.

JAMES ROBERT BEARD.
GRAHAM LEIGH PORTER.